US006899177B2

(12) United States Patent
Chatterj et al.

(10) Patent No.: US 6,899,177 B2
(45) Date of Patent: May 31, 2005

(54) METHODS OF CEMENTING SUBTERRANEAN ZONES WITH CEMENT COMPOSITIONS HAVING ENHANCED COMPRESSIVE STRENGTHS

(75) Inventors: Jiten Chatterj, Duncan, OK (US); Roger S. Cromwell, Walters, OK (US); Bobby J. King, Duncan, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/683,736

(22) Filed: Oct. 10, 2003

(65) Prior Publication Data

US 2005/0077045 A1 Apr. 14, 2005

(51) Int. Cl.[7] ............................ E21B 33/13; C04B 24/12
(52) U.S. Cl. ....................... 166/293; 106/677; 106/678; 106/725; 106/726; 106/727; 106/808; 106/809; 106/816; 166/292; 166/309; 507/202; 507/269
(58) Field of Search ................................. 166/292, 293, 166/294, 309; 106/677, 678, 725, 726, 727, 730, 808, 809, 816, 820, 823; 507/202, 269

(56) References Cited

U.S. PATENT DOCUMENTS

| 4,300,633 | A | * | 11/1981 | Stewart | 166/250.14 |
|---|---|---|---|---|---|
| 4,990,190 | A | * | 2/1991 | Myers et al. | 106/727 |
| 5,084,103 | A | * | 1/1992 | Myers et al. | 106/727 |
| 5,086,850 | A | | 2/1992 | Harris et al. | 175/61 |
| 5,121,795 | A | | 6/1992 | Ewert et al. | 166/292 |
| 5,123,487 | A | | 6/1992 | Harris et al. | 166/277 |
| 5,125,455 | A | | 6/1992 | Harris et al. | 166/292 |
| 5,127,473 | A | | 7/1992 | Harris et al. | 166/277 |
| 5,238,064 | A | | 8/1993 | Dahl et al. | 166/293 |
| 5,484,019 | A | * | 1/1996 | Griffith | 166/293 |
| 5,588,488 | A | * | 12/1996 | Vijn et al. | 166/293 |
| 5,696,059 | A | * | 12/1997 | Onan et al. | 507/269 |
| 5,806,594 | A | * | 9/1998 | Stiles et al. | 166/293 |
| 5,820,670 | A | * | 10/1998 | Chatterji et al. | 106/737 |
| 5,897,699 | A | * | 4/1999 | Chatterji et al. | 106/678 |
| 5,900,053 | A | * | 5/1999 | Brothers et al. | 106/678 |
| 5,968,255 | A | * | 10/1999 | Mehta et al. | 106/724 |
| 6,048,393 | A | | 4/2000 | Cheung et al. | 106/727 |
| 6,063,738 | A | | 5/2000 | Chatterji et al. | 507/269 |
| 6,145,591 | A | * | 11/2000 | Boncan et al. | 166/291 |
| 6,220,354 | B1 | * | 4/2001 | Chatterji et al. | 166/293 |
| 6,227,294 | B1 | | 5/2001 | Chatterji et al. | 166/293 |
| 6,290,772 | B1 | | 9/2001 | Cheung et al. | 106/727 |
| 6,457,524 | B1 | * | 10/2002 | Roddy | 166/293 |
| 6,562,122 | B2 | * | 5/2003 | Dao et al. | 106/705 |

* cited by examiner

Primary Examiner—George Suchfield
(74) Attorney, Agent, or Firm—Craig W. Roddy; McAfee & Taft P.C.

(57) ABSTRACT

Methods of cementing subterranean zones penetrated by well bores using cement compositions having enhanced compressive strengths are provided. A method of the invention basically comprises the steps of preparing or providing a cement composition having enhanced compressive strength upon setting comprising a hydraulic cement, sufficient water to form a slurry and a hydroxyamine compressive strength enhancing additive. Thereafter, the cement composition is placed in a subterranean zone to be cemented and allowed to set into an impermeable solid mass therein.

46 Claims, No Drawings

METHODS OF CEMENTING SUBTERRANEAN ZONES WITH CEMENT COMPOSITIONS HAVING ENHANCED COMPRESSIVE STRENGTHS

BACKGROUND OF THE INVENTION

1. Field of the Invention

The present invention relates to cementing subterranean zones penetrated by well bores with cement compositions having enhanced compressive strengths.

2. Description of the Prior Art

Subterranean zones penetrated by well bores are commonly sealed by hydraulic cement compositions. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and seals the exterior surfaces of the pipe string to the walls of the well bore. Hydraulic cement compositions are also utilized in a variety of cementing operations such as sealing highly permeable zones or fractures in subterranean zones, plugging cracks or holes in pipe strings and the like.

In all of the various cementing operations in subterranean zones which utilize hydraulic cement compositions, the cement compositions must have sufficient compressive strengths to resist cracking or shattering as a result of pipe movements, impacts and/or shocks subsequently generated by drilling and other well operations. The cement sheath in the annulus between a pipe string and the walls of a well bore often fails by cracking or shattering and the seal between the pipe string and well bore is lost.

Light weight cement compositions are utilized in subterranean zones which are unconsolidated or otherwise subject to fracturing at relatively low hydrostatic pressures. Light weight foamed cement compositions are also utilized in wells to prevent excessive hydrostatic pressure from being exerted on subterranean zones. In addition, a foamed cement composition contains compressed gas which improves the ability of the composition to maintain pressure and prevent the flow of formation fluids into and through the cement composition during its transition time, i.e., the time during which the cement composition changes from a true fluid to a hard set mass. Foamed cement slurries are also advantageous because they have low fluid loss properties.

While the heretofore utilized cement compositions, light weight cement compositions and light weight foamed cement compositions have been utilized successfully heretofore, failures often occur due to the cement compositions not having high enough compressive strengths at the high temperature and pressure conditions of the subterranean zones being cemented. Thus, there are continuing needs for improved subterranean zone normal weight cement compositions, light weight cement compositions and foamed cement compositions which have enhanced compressive strengths.

SUMMARY OF THE INVENTION

The present invention provides methods of cementing subterranean zones with cement compositions having enhanced compressive strengths which meet the needs described above and overcome the deficiencies of the prior art. An improved method of this invention for cementing a subterranean zone penetrated by a well bore comprises the following steps. A cement composition is prepared or provided having enhanced compressive strength upon setting comprising a hydraulic cement, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine. Thereafter, the cement composition is placed in a subterranean zone to be cemented and allowed to set into an enhanced strength impermeable solid mass.

Another method of this invention for cementing a subterranean zone penetrated by a well bore comprises the following steps. A light weight cement composition is prepared or provided having enhanced compressive strength upon setting comprising a mixture of a standard hydraulic cement having a particle size in the range of from about 10 microns to about 20 microns and a fine hydraulic cement having a particle size in the range of from about 2 microns to about 5 microns, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine. Thereafter, the cement composition is placed in a subterranean zone to be cemented and the cement composition is allowed to set into an impermeable solid mass having enhanced compressive strength.

Yet another method of the present invention for cementing a subterranean zone penetrated by a well bore comprises the following steps. A foamed cement composition having enhanced compressive strength upon setting is prepared or provided comprising a hydraulic cement, sufficient water to form a slurry, a hydroxyamine selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for foaming and stabilizing the slurry. Thereafter, the cement composition is laced in the subterranean zone to be cemented and allowed to set into an impermeable solid mass having enhanced compressive strength.

Still another method of this invention for cementing a subterranean zone penetrated by a well bore comprises the following steps. A foamed cement composition having enhanced compressive strength upon setting is prepared or provided comprising a hydraulic cement, a set retarder, a light weight filler, a compressive strength retrogration preventing additive, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for foaming and stabilizing the slurry. Thereafter, the cement composition is placed in the subterranean zone to be cemented and allowed to set into an impermeable solid mass having enhanced compressive strength.

Other and further objects, features and advantages of the present invention will be readily apparent to those skilled in the art upon a reading of the description of preferred embodiments which follows.

DESCRIPTION OF PREFERRED EMBODIMENTS

The improved methods of this invention which utilize improved cement compositions having enhanced compressive strengths are useful for performing a variety of completion and remedial procedures in subterranean zones penetrated by well bores. A method of this invention for cementing a subterranean zone penetrated by a well bore is comprised of the following steps. A cement composition having enhanced compressive strength upon setting is prepared or provided comprising a hydraulic cement, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine. The cement composition is placed in a subterranean zone to be cemented and allowed to set into an impermeable solid mass having enhanced compressive strength.

A variety of hydraulic cements can be utilized in accordance with the above described method including those comprised of calcium, aluminum, silicon, oxygen and/or sulfur which set and harden by reaction with water. Such hydraulic cements include Portland cements, pozzolana cements, gypsum cements, aluminous cements, silica cements, alkaline cements and slag cements. The hydraulic cements can be standard hydraulic cements of conventional particle sizes, i.e., particle sizes in the range of from about 10 microns to about 20 microns or fine hydraulic cements having particle sizes in the range of from about 2 microns to about 5 microns or mixtures thereof. Standard hydraulic cements are readily obtainable from a variety of sources. A particularly suitable fine hydraulic cement is commercially available under the trade name "MICRO MATRIX™" from Halliburton Energy Services of Duncan, Okla. Standard or fine Portland cements are generally preferred for use in accordance with this invention. Portland cements of the types defined and described in API SPECIFICATION FOR MATERIALS AND TESTING FOR WELL CEMENTS, API SPECIFICATION 10, $5^{th}$ EDITION, DATED JUL. 1, 1990 OF THE AMERICAN PETROLEUM INSTITUTE are particularly suitable. Preferred such API Portland cements include classes A, B, C, G and H, with API classes G and H being more preferred and class G being the most preferred.

The water in the cement composition can be fresh water or salt water. The term "salt water" is used herein to mean unsaturated salt solutions and saturated salt solutions including brine and seawater. The water is generally present in the cement composition of this invention in an amount in the range of from about 35% to about 200% by weight of the hydraulic cement therein.

The hydroxyamine additive included in the cement composition functions to enhance the compressive strength of the cement composition upon setting. Suitable hydroxyamine additives for use in accordance with the present invention include trisisopropanolamine (TIPA), 1-[N,N-bis(2-hydroxyethyl)-2-amino]-2-propanol (DEIPA), and N,N-bis(2-hydroxypropyl)ethanolamine (EDIPA). Of these, the N,N-bis(2-hydroxypropyl)ethanolamine additive is generally preferred.

The hydroxyamine additive is included in the cement composition in an amount in the range of from about 0.05% to about 5% by weight of hydraulic cement therein.

As will be understood by those skilled in the art, the subterranean zones penetrated by well bores which are cemented utilizing the cement compositions of this invention generally have temperatures in the range of from about 100° F. to about 500° F. and pressures in the range of from about 1000 psig to about 25,000 psig. The cement compositions useful in accordance with the methods of this invention readily set at the above temperature and pressure as well as at higher temperatures and pressures.

Another method of the present invention for cementing a subterranean zone penetrated by a well bore is comprised of the following steps. A light weight cement composition having enhanced compressive strength upon setting is prepared or provided comprising a mixture of a standard hydraulic cement having a particle size in the range of from about 10 microns to about 20 microns and a fine hydraulic cement having a particle size in the range of from about 2 microns to about 5 microns, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine. Thereafter, the cement composition is placed in the subterranean zone to be cemented and allowed to set into an impermeable solid mass having enhanced compressive strength.

The standard hydraulic cement and fine hydraulic cement utilized in the mixture, the water and the hydroxyamine additive are the same as those described above. The light weight cement composition differs from the cement composition described above in that it includes a mixture of standard hydraulic cement and fine hydraulic cement. The standard hydraulic cement is generally present in the mixture in an amount of about 35% by weight and the fine hydraulic cement is present therein in an amount of about 65% by weight.

The water utilized is the same as that described above, but more water is included in the light weight cement composition. That is, the water is present in the light weight cement composition in an amount in the range of from about 100% to about 200% by weight of the hydraulic cement mixture therein.

The hydroxyamine additive is included in the light weight cement composition in an amount in the range of from about 0.05% to about 5% by weight of the mixture of hydraulic cement therein.

Yet another method of this invention for cementing a subterranean zone penetrated by a well bore is comprised of the following steps. A foamed cement composition having enhanced compressive strength upon setting is prepared or provided comprising a hydraulic cement, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for foaming and stabilizing the slurry. Thereafter, the cement composition is placed in the subterranean zone to be cemented and allowed to set into an impermeable solid mass having enhanced compressive strength.

The hydraulic cement, water and hydroxyamine additives are the same as those described above. The water is present in the foamed cement composition in an amount in the range of from about 40% to about 60% by weight of hydraulic cement therein and the hydroxyamine additive utilized is present in an amount in the range of from about 0.05% to about 5% by weight of the hydraulic cement therein.

The gas utilized to form the foam can be air or nitrogen with nitrogen generally being preferred. The gas is present in the foamed cement composition in an amount in the range of from about 20% to about 35% by volume of the cement slurry formed.

The additive for foaming and stabilizing the slurry is a mixture of an ethoxylated alcohol ether sulfate surfactant, an alkyl or alkene amidopropyl betaine surfactant and an alkyl or alkene amidopropyl dimethyl amine oxide surfactant. The foaming and stabilizing additive is present in the foamed cement composition in an amount in the range of from about 1% to about 5% by volume of water therein. The foaming and stabilizing additive is described in detail in U.S. Pat. No. 6,063,738 issued to Chatterji et al. on May 16, 2000, which is incorporated herein by reference thereto.

Still another method of cementing a subterranean zone penetrated by a well bore of this invention is comprised of the following steps. A foamed cement composition having enhanced compressive strength upon setting is prepared or provided comprising a hydraulic cement, a set retarder, a light weight filler, a compressive strength retrogration preventing additive, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for forming and stabilizing the slurry. The foamed cement composition is placed in a subterranean zone to be cemented and allowed to set into an impermeable solid mass having enhanced compressive strength therein. This method is used in subterranean zones having high temperatures such as 200° F. and pressures above about 1000 psig.

The hydraulic cements that can be utilized in the high temperature foamed cement composition are the same as those described above. The amounts of the water, the hydroxyamine additive, the gas and the additive for foaming and stabilizing the slurry are also the same as the preceding foamed cement composition. The additional components which are included in the foamed cement composition are a carboxymethylhydroxyethlycellulose set retarder present in the foamed composition in an amount in the range of from 0.1% to about 2% by weight of hydraulic cement therein; an amorphous silica light weight filler present in the foamed cement composition in an amount in the range of from about 10% to about 20% by weight of hydraulic cement; and a fine crystalline silica compressive strength retrogration preventing additive present in the foamed cement composition in an amount in the range of from about 35% to about 70% by weight of hydraulic cement therein.

A preferred method of this invention for cementing a subterranean zone penetrated by a well bore comprises the steps of: (a) preparing or providing a cement composition having enhanced compressive strength upon setting comprising a hydraulic cement, sufficient water to form a slurry and a hydroxyamine additive selected from the group consisting of trisisopropanolanine, 1-[N,N-bis(2-hydroxyethyl)-2-amino]-2-propanol, and N,N-bis(2-hydroxypropyl)ethanolamine; (b) placing the cement composition in the subterranean zone to be cemented; and (c) allowing the cement composition to set into an impermeable solid mass therein.

Another preferred method of this invention for cementing a subterranean zone penetrated by a well bore comprises the steps of: (a) preparing or providing a light weight cement composition having enhanced compressive strength upon setting comprising a mixture of a standard hydraulic cement having a particle size in the range of from about 10 microns to about 20 microns and a fine hydraulic cement having a particle size in the range of from about 2 microns to about 5 microns, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine; (b) placing the cement composition in the subterranean zone to be cemented; and (c) allowing the cement composition to set into an impermeable solid mass therein.

Yet another method of this invention for cementing a subterranean zone penetrated by a well bore comprises the steps of: (a) preparing or providing a foamed cement composition having enhanced compressive strength upon setting comprising a hydraulic cement, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for foaming and stabilizing the slurry; (b) placing the foamed cement in the subterranean zone to be cemented; and (c) allowing the foamed cement to set into an impermeable solid mass therein.

Still another preferred method of this invention for cementing a subterranean zone penetrated by a well bore comprises the steps of: (a) preparing or providing a foamed cement composition having enhanced compressive strength upon setting comprising a hydraulic cement, a set retarder, a light weight filler, a compressive strength retrogration preventing additive, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for forming and stabilizing the slurry; (b) placing the foamed cement composition in the subterranean zone to be cemented; and (c) allowing the foam cement composition to set into an impermeable solid mass therein.

In order to further illustrate the methods and cement compositions of this invention, the following examples are given.

EXAMPLE 1

A cement slurry was prepared in the laboratory having a density of 16.3 pounds per gallon comprising Portland Class H cement and fresh water. To three samples of the cement slurry, hydroxyamine derivatives were added in amounts of 0.1% by weight of cement in the sample. The first sample contained trisisopropanolamine (TIPA); the second sample contained 1-[N,N-bis(2-hydroxyethyl)-2-amino]-2-proponal (DEIPA); and the third sample contained N,N-bis(2-hydroxypropyl)ethanolamine (EDIPA). Portions of the three cement slurry samples along with portions of a cement slurry sample that did not include a hydroxyamine derivative were cured at 140° F. for 24 hours, 72 hours, 7 days, 14 days and 28 days, respectively. At the end of the curing periods, the compressive strengths of the cured cement portions were determined. The results of these tests are set forth in Table I below.

TABLE I

| Hydroxyamine Derivative | Amount, % by weight of cement | Compressive Strength, psi | | | | |
|---|---|---|---|---|---|---|
| | | 24 Hrs. | 3 Days | 7 Days | 14 Days | 28 Days |
| None | — | 3049 | 3668 | 3885 | 3673 | 2423 |
| TIPA | 0.1 | 2766 | 3400 | 3562 | 3753 | 4532 |
| DEIPA | 0.1 | 3307 | 4152 | 3895 | 3600 | 3638 |
| EDIPA | 0.1 | 2991 | 3475 | 2413 | 2205 | 2604 |

As can be seen from Table 1, the TIPA and DEIPA hydroxyamine derivatives improved the compressive strengths of several of the cured sample portions with DEIPA appearing to outperform the other derivatives.

EXAMPLE 2

A light weight cement slurry was prepared having a density of 11 pounds per gallon comprising a mixture of 35% by weight standard Portland Class H cement and 65% by weight fine Portland Class H cement in fresh water. To three samples of the cement slurry, TIPA, DEIPA and EDIPA were separately added in amounts of 0.1% by weight of cement in the sample. To a fourth cement slurry sample DEIPA was added in an amount of 1.0% by weight of cement in the sample. Portions of the four cement slurry samples along with portions of a cement slurry sample that did not include a hydroxyamine derivative were cured at 140° F. for 24 hours, 72 hours, 7 days, 14 days and 28 days, respectively. At the end of the curing periods, the compressive strengths of the cured cement portions were determined. The results of these tests are set forth in Table II below.

TABLE II

| Hydrox-yamine Derivative | Amount, % by weight of cement | Compressive Strength, psi | | | | |
|---|---|---|---|---|---|---|
| | | 24 Hrs. | 3 Days | 7 Days | 14 Days | 28 Days |
| None | — | 187 | 210 | 369 | 257 | 229 |
| TIPA | 0.1 | 243 | 246 | 331 | 233 | 233 |
| DEIPA | 0.1 | 225 | 254 | 394 | 335 | 350 |
| EDIPA | 0.1 | 205 | 270 | 260 | 258 | 227 |
| DEIPA | 1.0 | 233 | — | 262 | 355 | — |

As can be seen from Table II, all three of the hydroxyamine derivatives improved the compressive strengths of several of the cured sample portions with DEIPA appearing to outperform the other derivatives.

EXAMPLE 3

A foamed cement slurry was prepared with air having a foamed density of 11.2 pounds per gallon (32% foam quality) comprising Portland Class H cement, a foaming and foam stabilizing additive comprising a mixture of an ethoxylated alcohol ether sulfate surfactant, an alkyl or alkene amidopropyl betaine surfactant and an alkyl or alkene amidopropyl dimethylamine oxide surfactant present in an amount of 2% by volume of water in the cement slurry and sufficient water to form the slurry. To three samples of the cement slurry, TIPA, DEIPA ad EDIPA were separately added in amounts of 0.1% by weight of cement in the sample. Portions of the three cement slurry samples along with portions of a cement slurry sample that did not include a hydroxyamine derivative were cured at 140° F. for 24 hours, 72 hours, 7 days, 14 days and 28 days. At the end of the curing periods, the compressive strengths of the cured cement portions were determined. The results of these tests are set forth in Table III below.

TABLE III

| Hydrox-yamine Derivative | Amount, % by weight of cement | Compressive Strength, psi | | | | |
|---|---|---|---|---|---|---|
| | | 24 Hrs. | 3 Days | 7 Days | 14 Days | 28 Days |
| None | — | 888 | 1153 | 1515 | 1187 | 1181 |
| TIPA | 0.1 | 655 | 935 | 916 | 1345 | 1298 |
| DEIPA | 0.1 | 1252 | 1300 | 1486 | 1382 | 1283 |
| EDIPA | 0.1 | 1381 | 1645 | 1503 | 1658 | 1737 |

As can be seen from Table III, all three of the hydroxyamine derivatives improved the compressive strengths of several of the cured sample portions with EDIPA appearing to outperform the other derivatives.

EXAMPLE 4

A high temperature foamed cement slurry was prepared with nitrogen in a MACS Analyzer at 140° F. and 1000 psig. The foamed cement slurry had a foamed density of about 12 pounds per gallon and was comprised of a Portland Class H cement, a carboxymethylhydroxyethyl cellulose set retarder present in the slurry in an amount of 0.4% by weight of cement therein, an amorphous silica light weight filler present in the slurry in an amount of 10% by weight of cement therein, a fine crystalline silica compressive strength retrogration preventing additive present in the slurry in an amount of 35% by weight of cement therein, water and a foaming and foam stabilizing additive present in the slurry in an amount of 2% by weight of cement therein (see Example 3 for the additive description and see column 5 of U.S. Pat. No. 6,227,294 issued to Chatterji et al. on May 8, 2001 which is incorporated herein by reference thereto for a description of the MACS Analyzer). The foamed slurry formed was continuously stirred for one hour and then transferred to two curing cells preheated to 200° F. temperatures.

Additional foamed cement slurries containing DEIPA and EDIPA in amounts of 0.1% by weight of cement were prepared in the MACS Analyzer and transferred to curing cells preheated to 200° F. The various cured foamed cement slurries were tested for compressive strength after 3 days and after 7 days. The results of these tests along with the densities, specific gravities and gas percentages of the foamed cement slurries are set forth in Table IV below.

TABLE IV

| Hydrox-yamine Derivative | Amount % by weight of cement | Density lb/gal | Compressive Strength, psi | | % Gas | Specific Gravity |
|---|---|---|---|---|---|---|
| | | | 3 Days | 7 Days | | |
| — | — | 12.5 | 1320 | — | 24.54 | 1.5 |
| — | — | 12.27 | — | 1735 | 24.93 | 1.47 |
| DEIPA | 0.1 | 11.52 | 1180 | — | 30.46 | 1.38 |
| DEIPA | 0.1 | 11.6 | — | 1440 | 29.97 | 1.39 |
| EDIPA | 0.1 | 12.04 | 1645 | — | 27.32 | 1.44 |
| EDIPA | 0.1 | 11.34 | — | — | 31.54 | 1.36 |

As can be seen from Table IV, the presence of hydroxyamine derivatives can increase the compressive strengths of foamed cement slurries and do not show any adverse effects on the foamed cement slurries.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:
   (a) preparing or providing a cement composition having enhanced compressive strength upon setting comprising a hydraulic cement, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine;
   (b) placing said cement composition in said subterranean zone to be cemented; and (c) allowing said cement composition to set into an impermeable solid mass therein.

2. The method of claim 1 wherein said subterranean zone has a temperature above about 100° F. and a pressure above about 1000 psig.

3. The method of claim 1 wherein said hydraulic cement is selected from the group consisting of Portland cements, slag cements, pozzolana cements, gypsum cements, aluminous cements, silica cements, alkaline cements and mixtures thereof.

4. The method of claim 1 wherein said hydraulic cement is Portland cement.

5. The method of claim 1 wherein said water is selected from the group consisting of fresh water and salt water.

6. The method of claim 1 wherein said water is present in said cement composition in an amount in the range of from about 35% to about 200% by weight of hydraulic cement therein.

7. The method of claim 1 wherein said hydroxyamine additive is 1-[N,N-bis(2-hydroxyethyl)-2-amino]-2-propanol.

8. The method of claim 1 wherein said hydroxyamine additive is present in said cement composition in an amount in the range of from about 0.05% to about 5% by weight of hydraulic cement therein.

9. A method of cementing a subterranean zone penetrated by a well bore comprising the steps of:

(a) preparing or providing a light weight cement composition having enhanced compressive strength upon setting comprising a mixture of a standard hydraulic cement having a particle size in the range of from about 10 microns to about 20 microns and a fine hydraulic cement having a particle size in the range of from about 2 microns to about 5 microns, sufficient water to form a slurry and a hydroxyamine additive selected from the group consisting of trisisopropanolamine, 1-[N,N-bis(2-hydroxyethyl)-2-amino]-2-propanol, and N,N-bis(2-hydroxypropyl)ethanolamine;

(b) placing said cement composition in said subterranean zone to be cemented; and (c) allowing said cement composition to set into an impermeable solid mass therein.

10. The method of claim 9 wherein said subterranean zone has a temperature above about 100° F. and a pressure above about 1000 psig.

11. The method of claim 9 wherein said standard hydraulic cement is present in said mixture in an amount of about 35% by weight and said fine hydraulic cement is present therein in an amount of about 65% by weight.

12. The method of claim 9 wherein said standard hydraulic cement and said fine hydraulic cement are selected from the group consisting of Portland cements, slag cements, pozzolana cements, gypsum cements, aluminous cements, silica cements, alkaline cements and mixtures thereof.

13. The method of claim 9 wherein said standard cement and said fine cement are Portland cements.

14. The method of claim 9 wherein said water is selected from the group consisting of fresh water and salt water.

15. The method of claim 9 wherein said water is present in said cement composition in an amount in the range of from about 100% to about 200% by weight of hydraulic cement therein.

16. The method of claim 9 wherein said hydroxyamine additive is 1-[N,N-bis(2-hydroxyethyl)-2-amino]-2-propanol.

17. The method of claim 9 wherein said hydroxyamine additive is present in said cement composition in an amount in the range of from about 0.05% to about 5% by weight of hydraulic cement therein.

18. A method of cementing a subterranean zone penetrated by a well bore comprising the steps of:

(a) preparing or providing a foamed cement composition having enhanced compressive strength upon setting comprising a hydraulic cement, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for foaming and stabilizing said slurry;

(b) placing said foamed cement in said subterranean zone to be cemented; and (c) allowing said foamed cement to set into an impermeable solid mass therein.

19. The method of claim 18 wherein said subterranean zone has a temperature above about 100° F. and a pressure above about 1000 psig.

20. The method of claim 18 wherein said hydraulic cement is selected from the group consisting of Portland cements, slag cements, pozzolana cements, gypsum cements, aluminous cements, silica cements, alkaline cements and mixtures thereof.

21. The method of claim 18 wherein said hydraulic cement is Portland cement.

22. The method of claim 18 wherein said water is selected from the group consisting of fresh water and salt water.

23. The method of claim 18 wherein said water is present in said foamed cement composition in an amount in the range of from about 40% to about 60% by weight of hydraulic cement therein.

24. The method of claim 18 wherein said hydroxyamine additive is 1-[N,N-bis(2-hydroxyethyl)-2-amino]-2-propanol.

25. The method of claim 18 wherein said hydroxyamine additive is present in said foamed cement composition in an amount in the range of from about 0.05% to about 5% by weight of hydraulic cement therein.

26. The method of claim 18 wherein said gas is selected from the group consisting of air and nitrogen.

27. The method of claim 18 wherein said gas is present in said foamed cement composition in an amount in the range of from about 20% to about 35% by volume of said slurry.

28. The method of claim 18 wherein said additive for foaming and stabilizing said slurry is a mixture of an ethoxylated alcohol ether sulfate surfactant, an alkyl or alkene amidopropyl betaine surfactant and an alkyl or alkene amidopropyl dimethyl amine oxide surfactant.

29. The method of claim 18 wherein said additive for foaming and stabilizing said slurry is present in said foamed cement composition in an amount in the range off from about 1% to about 5% by volume of water therein.

30. A method of cementing a subterranean zone penetrated by a well bore comprising the steps of:

(a) preparing or providing a foamed cement composition having enhanced compressive strength upon setting comprising a hydraulic cement, a set retarder, a light weight filler, a compressive strength retrogration preventing additive, sufficient water to form a slurry, a hydroxyamine additive selected from the group consisting of trisisopropanolamine, 1-[N,N-bis(2-hydroxyethyl)-2-amino]-2-propanol, and N,N-bis(2-hydroxypropyl)ethanolamine, sufficient gas to form a foam and an additive for forming and stabilizing said slurry;

(b) placing said foamed cement composition in said subterranean zone to be cemented; and (c) allowing said foamed cement composition to set into an impermeable solid mass therein.

31. The method of claim 30 wherein said subterranean zone has a temperature above about 100° F. and a pressure above about 1000 psig.

32. The method of claim 30 wherein said hydraulic cement is selected from the group consisting of Portland cements, slag cements, pozzolana cements, gypsum cements, aluminous cements, silica cements, alkaline cements and mixtures thereof.

33. The method of claim 30 wherein said hydraulic cement is Portland cement.

34. The method of claim 30 wherein said set retarder is present in said foamed cement composition in an amount in the range of from about 0.1% to about 2% by weight of hydraulic cement therein.

35. The method of claim 30 wherein said light weight filler is amorphous silica.

36. The method of claim 30 wherein said light weight filler is present in said foamed cement composition in an amount in the range of from about 10% to about 20% by weight of hydraulic cement therein.

37. The method of claim 30 wherein said compressive strength retrogration preventing additive is fine crystalline silica.

38. The method of claim 30 wherein said fine crystalline silica is present in said foamed cement composition in an amount in the range of from about 35% to about 70% by weight of hydraulic cement therein.

39. The method of claim 30 wherein said water is selected from the group consisting of fresh water and salt water.

40. The method of claim 30 wherein said water is present in said foamed cement composition in an amount in the range of from about 40% to about 60% by weight of hydraulic cement therein.

41. The method of claim 30 wherein said hydroxyamine additive is 1-[N,N-bis(2-hydroxyethyl)-2-amino]-2-propanol.

42. The method of claim 30 wherein said hydroxyamine additive is present in said foamed cement composition in an amount in the range of from about 0.05% to about 5% by weight of hydraulic cement therein.

43. The method of claim 30 wherein said gas is selected from the group consisting of air and nitrogen.

44. The method of claim 30 wherein said gas is present in said foamed cement composition in an amount in the range of from about 20% to about 35% by volume of said slurry.

45. The method of claim 30 wherein said additive for foaming and stabilizing said slurry is a mixture of an ethoxylated alcohol ether sulfate surfactant, an alkyl or alkene amidopropyl betaine surfactant and an alkyl or alkene amidopropyl dimethyl amine oxide surfactant.

46. The method of claim 30 wherein said additive for foaming and stabilizing said slurry is present in said foamed cement composition in an amount in the range of from about 1% to about 5% by volume of water therein.

* * * * *